Aug. 23, 1932.    G. E. BIGELOW ET AL    1,873,267
COOLING ARRANGEMENT FOR PACKING BOXES
Filed April 24, 1928
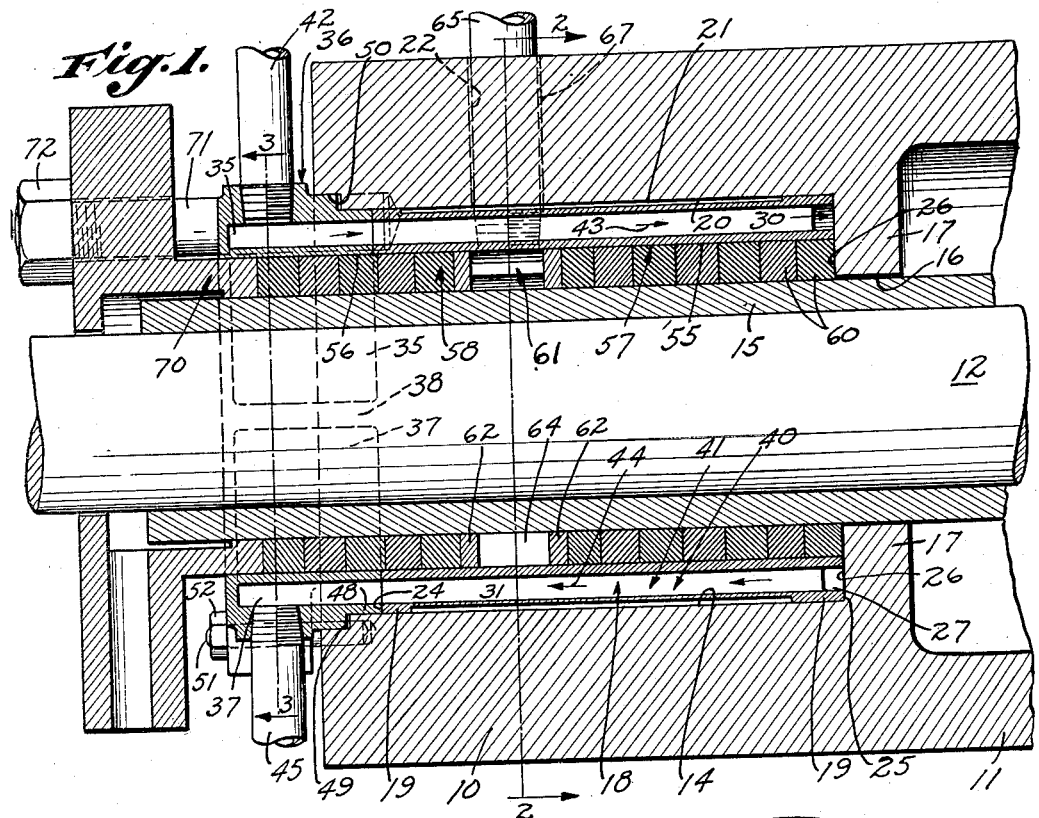
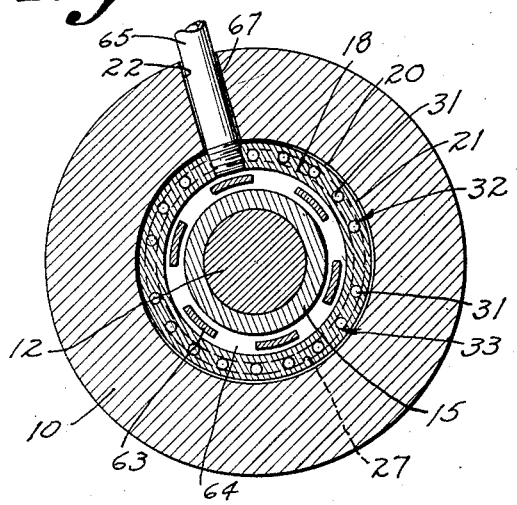
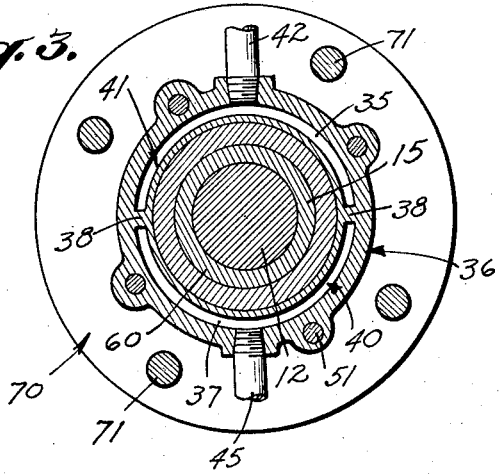
INVENTORS:
George E. Bigelow,
Arthur R. Weis,
BY
ATTORNEY.

Patented Aug. 23, 1932

1,873,267

UNITED STATES PATENT OFFICE

GEORGE E. BIGELOW AND ARTHUR R. WEIS, OF HUNTINGTON PARK, CALIFORNIA, ASSIGNORS OF ONE-HALF TO PACIFIC PUMP WORKS, OF HUNTINGTON PARK, CALIFORNIA, A CORPORATION OF CALIFORNIA

COOLING ARRANGEMENT FOR PACKING BOXES

Application filed April 24, 1928. Serial No. 272,558.

Our invention relates to cooling devices, and more particularly to a device for cooling a packing.

In the oil refining industry, it is desirable to be able to pump heated oil from one apparatus in the refinery to another. This oil is often under extremely high temperatures and pressures, the temperature reaching as high as 1000° F. Pumps capable of handling oil at this high temperature and pressure are at present in use, but a great deal of trouble and inconvenience is caused when using the conventional stuffing boxes around the shafts extending from these pumps. The packing used deteriorates very quickly due to the intense heat thereon. Furthermore, this highly heated packing tends to score the rotating surface due to the high degree of compression necessarily maintained on the packing in order to prevent leakage therethrough.

It is an object of our invention to provide a novel fluid-cooled packing structure.

Another object of our invention is to provide a cooling member surrounding a packing, this cooling member having longitudinal passages therein.

Another object of our invention is to provide such a cooling member in which the cooling fluid passes through certain of the longitudinal passages and returns through other of these passages, this cooling fluid passing at least partially around the rotatable member during its passage through the fluid member.

Further objects and advantages of our invention will be made evident hereinafter.

We illustrate a preferred form of our invention in the accompanying drawing. Referring to this drawing:

Fig. 1 is a vertical sectional view of a packing body incorporating our invention.

Fig. 2 is a sectional view taken on the line 2—2 of Fig. 1.

Fig. 3 is a sectional view taken on the line 3—3 of Fig. 1.

Referring to Fig. 1, we illustrate a packing body 10 which may conveniently be formed integrally with a casing 11 enclosing a pump or other mechanism which may either develop high temperatures, or be subjected to high temperatures due to a passage therethrough of a heated liquid, such as oil. A rotating portion of this pump or other mechanism is connected to a shaft 12 which extends outward through the casing 11 longitudinally through a packing chamber 14 formed in the body 10. This shaft may have a sleeve 15 thereon in a well-known manner, the shaft 12 and the sleeve 15 thus forming a rotable element which passes through an opening 16 in a flange 17 separating the interior of the casing 11 from the packing chamber 14.

Disposed in the packing chamber 14 is a longitudinal member 18 which has end portions 19 which slidably engage the cylindrical wall of the packing chamber 14. The longitudinal member 18 is so formed that an annular air chamber 20 is defined between the end portions 19, and between an outer cylindrical surface 21 of the member 18 and the cylindrical wall of the packing chamber 14. An opening 22 is formed through the body 10 communicating with this annular air chamber 20.

The longitudinal member 18 has radial ends 24 and 25, the end 25 being adapted to engage a radial wall 26 of the flange 17 so as to make a fluid-tight joint therebetween. The end 25 has an annular passage 27 formed therearound concentric with the axis of the longitudinal member 18. This annular passage cooperates with the radial wall 26 to form an annular chamber 30.

Extending through the longitudinal member 18 is a plurality of holes 31, these holes communicating between the end 24 and the annular chamber 30.

The holes 31 are formed in two groups, a primary group 32 being situated above the horizontal center line of the shaft 12 and a secondary group 33 being situated below this horizontal center line. Each of the holes 31 of the primary group 32 communicates with an intake chamber 35 formed in a head member 36. This intake chamber 35 is annular in shape, as best shown in Fig. 3. Similarly a discharge chamber 37 formed in the head member 36 is adapted to communicate with each of the secondary group of holes 33. The intake and discharge chambers 35 and 37 are separated by walls 38 so that there is no intercommunication therebetween.

Chambers 35 and 37 cooperate with the holes 31 to form a longitudinal passage 40 extending through the head member 36 and the longitudinal member 18, these two members cooperating to form a cooling member 41. This cooling member is cooled by a fluid supplied to the intake chamber 35 by a pipe 42, this fluid passing from this chamber through all of the holes 31 of the primary group 32, as indicated by arrows 43 of Fig. 1.

The fluid reaches the annular chamber 30 and is conducted therethrough around the shaft 12 until it reaches the holes 31 of the secondary group 33 being conducted therethrough in a direction indicated by arrows 44 and reaching the discharge chamber 37. A pipe 45 is adapted to conduct the now heated fluid from the discharge chamber.

The head member 36 may conveniently hold the longitudinal member 18 in place by engaging the end 24. This we accomplish by means of a sleeve 48 formed on the head member 36 and slidably disposed in the packing chamber 14. A shoulder 49 of the head member 36 is also adapted to be slidable in a countersunk bore 50 of the body 10, the shoulder 49 and the end of this countersunk bore being normally separated, as indicated in Fig. 1. Studs 51 are screwed into the body 10 and extend through the head member 36, these studs having nuts 52 thereon which bear against the head member and force it into firm engagement with the longitudinal member 18, thus insuring a tight fit between the end 25 of this longitudinal member and the radial wall 26. An inner surface 55 of the longitudinal member 18, and an inner surface 56 of the head member 36 are concentric with the axis of the shaft 12 and cooperate to form a continuous packing-retaining surface 57. An annular packing member 58 is adapted to fit between the sleeve 15 and the surface 55. This packing member 58 is formed of a number of rings 60, these rings being separated near the outer end of the packing member 58 by an annular lantern 61.

This lantern has hub portions 62 connected by arms 63 so that any leakage through the rings 60 to the rod of this lantern will collect in a space 64, this space being by-passed to the exterior of the body by means of a pipe 65 communicating therewith. This pipe is threadedly received in the body 10, and passes upward through the opening 22, leaving an air space 67 therebetween which communicates with the annular air chamber 20.

The packing rings 60 are preferably formed of a metallic substance, and are suitably compressed by a gland 70 which extends between the surface 57 and the external surface of the sleeve 15. This gland 70 is axially movable relative to the shaft 12 by means of studs 71 extending therethrough, these studs being threaded into the end of the body 10. Nuts 72 are threaded to the end of the studs. When it is desired to adjust the packing, the nuts 72 are uniformly rotated, thus forcing the gland 70 into tighter engagement with the packing rings 60 and thus insuring the leakproof joint between the rotatable and stationary members.

The casing 11 is ordinarily at a very high temperature, and due to the fact that the metal forming this casing is a good conductor of heat the body 10 is similarly subjected to high temperatures.

In the ordinary type of packing, this heat would be conducted directly to the packing member which in turn would tend to score the outer surface of the rotating element. Heat is also generated by contact between the packing member 58 and the sleeve 15. Furthermore, the shaft is ordinarily at a high temperature and conducts heat to the packing member, thus increasing the hazard of scoring the sleeve and permitting leakage through this packing member. The cooling member 41 absorbs heat from the body 10, the shaft and sleeve 12, and the packing member 58. Being in direct contact with the packing member 58 throughout its length, this cooling member draws a major portion of the heat from the packing member, thus insuring that no scoring of the sleeve 15 will result.

The importance of our invention may well be realized when it is known that before it is possible to replace a scored sleeve, or insert new packing therearound, an oil pump operating under high temperatures must be allowed to cool for sometimes twenty-four hours before the temperature is decreased sufficiently to permit these parts to be replaced. Inasmuch as such replacements are often needed when utilizing the conventional types of packers, it will be seen that our invention accomplishes a dual economy,—first, it permits longer life of packer and sleeve, and second, it permits a cooler body 10 so that when replacements are made, the time element involved during the cooling of the body will be materially lessened.

It should be understood that our cooling arrangement is not limited to the specific structure shown nor to a packer as described. The packing rings 60 might thus be replaced by a bearing sleeve without departing from the spirit of our invention.

We claim as our invention:

1. In combination with a body having a packing chamber therein, and a movable member extending therethrough: a cylindrical member adapted to be positioned in said packing chamber, said cylindrical member having an annular passage in one end thereof cooperating with a wall of said packing chamber to form an annular chamber, said cylindrical member also having primary and secondary groups of holes communicating with said annular chamber and terminating at a front end of said cylindrical member opposite said annular chamber; a head member engaging said front end and providing an intake chamber communicating with the holes of said primary group and a discharge chamber communicating with the holes of said secondary group; a packing means between said rotatable member and said cylindrical member; and means for compressing said packing means.

2. A combination as defined in claim 1 in which said packing extends into said head member and in which said last-named means extends through said head member to engage said packing means.

3. In combination: a body having a packing chamber therein; a movable element extending through said packing chamber; a cooling member in said packing chamber and cooperating with the walls thereof in defining an annular air space, said body providing an opening communicating between the exterior thereof and said air space; a lantern structure between said movable element and said cooling member; packing means adjacent said lantern structure; and a pipe secured to said cooling member and communicating with said lantern structure, said pipe being smaller in diameter than said opening of said body and extending therethrough.

4. In combination: a body having a packing chamber therein; a movable element extending through said packing chamber; a packing in said packing chamber and contacting said movable element; a longitudinal member surrounding said packing and cooperating with the walls of said packing chamber in defining an annular passage vented to the outside of said body.

5. In combination with a body having a packing chamber therein, and a movable member extending therethrough: a cylindrical member adapted to be positioned in said packing chamber, said member having an annular passage in one end thereof cooperating with a wall of said packing chamber to form an annular chamber, said member also having passages communicating with said annular chamber and extending toward the opposite end of said member; means for supplying a cooling medium to some of said passages; and means for conveying said cooling medium from the other of said passages.

6. In combination: a body having a packing chamber therein; a movable element extending through said packing chamber; a cylindrical member in said packing chamber and cooperating with the walls thereof in defining an annular space vented through said body to the exterior thereof, said cylindrical member providing primary passages and secondary passages and an annular passage, said annular passage cooperating with a wall of said packing chamber to define an annular chamber communicating with said primary and said secondary passages; means for supplying a cooling medium to said primary passages; and means for conveying said medium from said secondary passages.

In testimony whereof, we have hereunto set our hands at Los Angeles, California, this 11th day of April, 1928.

GEORGE E. BIGELOW.
ARTHUR R. WEIS.

CERTIFICATE OF CORRECTION.

Patent No. 1,873,267. August 23, 1932.

GEORGE E. BIGELOW ET AL.

It is hereby certified that error appears in the printed specification of the above numbered patent requiring correction as follows: Page 3, line 10, claim 1, for the word "rotatable" read movable; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.